United States Patent [19]

Komaroff et al.

[11] 4,397,283

[45] Aug. 9, 1983

[54] IGNITION ONSET SENSOR FOR INTERNAL COMBUSTION ENGINES

[75] Inventors: Iwan Komaroff, Regensburg; Katsucki Itoh, Leonberg, both of Fed. Rep. of Germany

[73] Assignee: Robert Bosch GmbH, Stuttgart, Fed. Rep. of Germany

[21] Appl. No.: 344,104

[22] Filed: Jan. 29, 1982

Related U.S. Application Data

[63] Continuation of Ser. No. 103,926, Dec. 18, 1979, abandoned.

[30] Foreign Application Priority Data

Feb. 14, 1979 [DE] Fed. Rep. of Germany ....... 2905506

[51] Int. Cl.³ .................. F02B 3/00; G01K 21/76; F02M 39/00; F02P 5/04
[52] U.S. Cl. ..................... 123/494; 123/501; 73/35; 350/96.1
[58] Field of Search ............... 123/419, 425, 478, 494; 73/35, 346; 350/96.1, 96.11, 96.12, 96.13, 96.14, 96.15

[56] References Cited

U.S. PATENT DOCUMENTS

| 2,841,979 | 7/1958 | Harbart | 73/35 |
| 3,720,192 | 3/1973 | Aono | 123/494 |
| 4,039,845 | 8/1977 | Oberhansli et al. | 350/96.1 |
| 4,109,616 | 8/1978 | Zechnall et al. | 123/478 |
| 4,185,274 | 1/1980 | Giallorenzi | 350/96.1 |

*Primary Examiner*—Raymond A. Nelli
*Attorney, Agent, or Firm*—Edwin E. Greigg

[57] ABSTRACT

An ignition onset sensor for internal combustion engines or the like including an optoelectric converter connected directly or indirectly with the combustion chamber of the engine, the converter having one side facing the combustion chamber which can be freed of soiling by being burned off or glow heated. The ignition onset sensor is particularly useful in internal combustion engines having direct injection as the onset of fuel supply by the fuel pump or the onset of injection at the fuel nozzle can be regulated on the basis of a signal of the ignition onset sensor. The burn-off of the side of the converter facing the combustion chamber is preferably accomplished by an electric arc and, in the case of glow heating, by means of a glow filament disposed in front of that side of the converter, the burn-off or glow heating process being controlled in accordance with the engine operational status, engine operational parameters, and/or at selected times.

8 Claims, 4 Drawing Figures

IGNITION ONSET SENSOR FOR INTERNAL COMBUSTION ENGINES

This is a continuation of application Ser. No. 103,926, filed Dec. 18, 1979, now abandoned.

BACKGROUND OF THE INVENTION

The invention relates generally to optical sensors for sensing the combustion of an air-fuel mixture within a combustion chamber of an internal combustion engine, and, more particularly, to a sensor for providing an ignition onset signal to a closed-loop regulating apparatus for controlling the engine combustion process.

The onset and the course of the combustion process within the cylinders of an internal combustion engine are important in determining the behavior of the engine. In an externally-ignited internal combustion engines, ignition of the fule-air mixture within each cylinder is initiated by an ignition spark, whereas in self-ignited internal combustion engines, the ignition of the fuel-air mixture within each cylinder is initiated by the injection of fuel into the cylinder. In both types of engines, there is a brief delay between the initiation of the ignition spark or the fuel injection and the actual onset of combustion of the fuel-air mixture.

The actual onset of combustion within a combustion chamber of an internal combustion engine may be precisely sensed by an optical sensor device. However, until the present invention, an optical sensor device for providing an ignition onset signal indicating the actual onset of combustion has not been used in known closed-loop control systems for regulating the onset of combustion in accordance with selected operating parameters, such as engine speed, for the reason that prior known optical sensors for sensing conditions within the combustion chamber of an internal combustion engine generally are relatively expensive laboratory devices which are not designed for reliable operation over the normal operational life of the engine, at least not without requiring extensive maintainance at relatively frequent intervals. Consequently, until the present invention, sensors for indicating the initiation of either the ignition spark or the fuel injection which determines the onset of combustion have been used in these closed-loop control systems.

For example, U.S. Pat. No. 4,033,310, issued July 5, 1977 to Nicholls, U.S. Pat. No. 4,019,478, issued Apr. 26, 1977 to Hobo et al, U.S. Pat. No. 3,934,430, issued Jan. 27, 1976 to Fuso, and U.S. Pat. No. 3,796,197, issued Mar. 12, 1974 to Locher et al, incorporated herein by reference, describe closed-loop control systems in which the onset of fuel injection in a Diesel engine is regulated to thus regulate the onset of ignition. Each of these known regulating systems include a fuel injection onset sensor, engine operating parameter sensors, including an engine speed sensor, and an electronic controller which is connected to receive the output signals of these sensors. The electronic controller includes a signal processing circuit for generating a set-point corresponding to the desired fuel injection onset and a comparator circuit for comparing the set-point signal with the output signal of the fuel injection onset sensor to generate a deviation signal corresponding to the difference between the actual and desired fuel injection onset values. The deviation signal is supplied to a final control element of an injection adjuster for adjusting the fuel injection timing of a fuel injection timing of a fuel injection pump driven by the engine in accordance with the deviation signal to achieve the desired fuel injection onset. It would be highly desirable if these known closed-loop systems included an optical sensor for detecting the onset of ignition, rather than a sensor for detecting the onset of fuel injection, since it is the onset of ignition which determines the functioning of the engine.

U.S. Pat. No. 2,841,979, issued July 8, 1958 to Harbert, describes a device for observing combustion phenomena occurring within spark-ignited internal combustion engines. The device includes a spark plug having a hollow central electrode containing a rod formed of a transparent material such as quartz or sapphire, which transmits light impinging on the end of the transparent rod exposed to the combustion chamber through the rod and a heat exchanger for the spark plug to a photoelectric cell or the like, which generates a signal proportional to this light. It is indicated that the deposition of carbon or other material on the transparent rod is much less than the deposition of such materials on the surface of quartz windows, disposed in the engine block, which were previously used to observe combustion phenomena. Consequently, the length of test runs of a spark-ignited internal combustion engine, during which this device is used to observe combustion phenomena, is much greater than that previously possible using quartz windows, and runs over 100 hours in length have been conducted using this device with no problem of lack of light from the combustion reaction being encountered.

OBJECTS AND SUMMARY OF THE INVENTION

It is an object of the invention to provide an ignition onset sensor, having a light receiving surface in communication with the combustion chamber of an internal combustion engine and a controllable heating element for cleaning the light receiving surface, for generating an output signal indicating ignition onset within the combustion chamber in accordance with light generated during ignition and received at the light receiving surfaces of the sensor.

It is a further object of the invention to provide this sensor as an ignition onset sensor of a closed-loop control system for regulating the onset of ignition within the engine combustion chamber, to assure reliable operation of the sensor over the operational life of the engine.

The ignition onset sensor of the invention has the advantage over the prior art in that it is simple in design and, furthermore, the problem of soiling no longer plays a significant role. This is because the ignition onset sensor must respond only to relative variations in the light intensity as a function of time and the detection of the absolute light intensity has no significance. For this reason, soiling of the light-voltage converter which remains within limits does not affect the output signal of the ignition onset sensor.

It has proved to be particularly advantageous to burn off the side of the converter facing the combustion chamber by means of an electric arc, or to remove soiling by glow heating with the use of a glow filament.

The invention will be better understood and further objects and advantages thereof become more apparent from the ensuing detailed description of a preferred embodiment taken in conjunction with the drawings.

DESCRIPTION OF THE PREFERRED EMBODIMENT

Figure 1A:
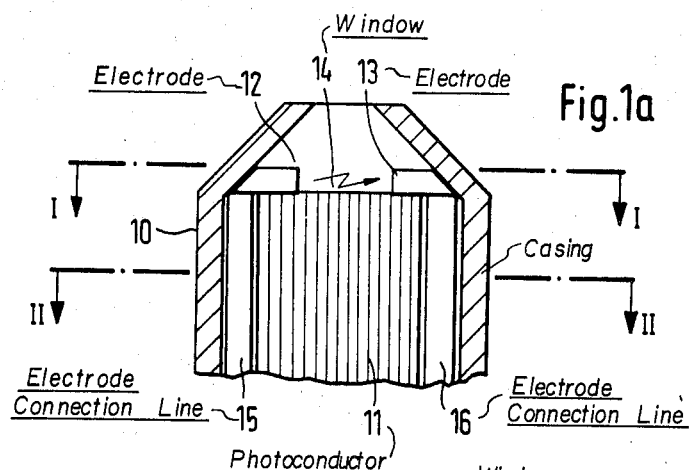
FIG. 1a is a vertical sectional view of an ignition onset sensor.

FIG. 1 shows the head portion 23 of an ignition onset sensor 24, which may be used, for example, to detect the onset of fuel ignition in the cylinder of an internal combustion engine. The outer casing 10 of a photoconductor or opto-electric converter 11 tapers in the manner of a truncated cone toward the combustion chamber and encloses two electrodes 12 and 13, which perform the burn-off of soil on a light receiver end surface on window 14 of the photoconductor 11. The electrical connection lines 15 and 16 of the electrodes 12 and 13 respectively are also located within the casing 10.

Figure 1B:
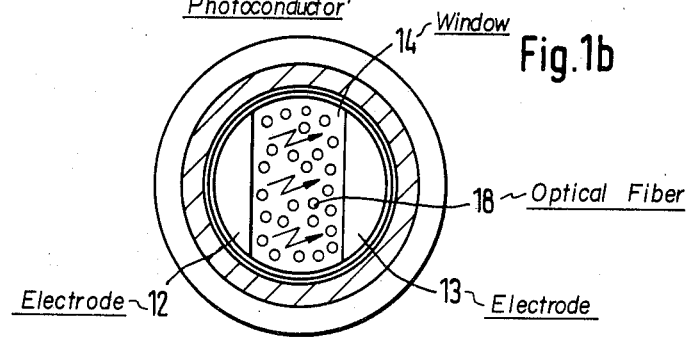
FIG. 1b is a sectional view of the ignition onset sensor head portion of FIG. 1a taken substantially along line I—I in the direction of the arrows.
Figure 1C:
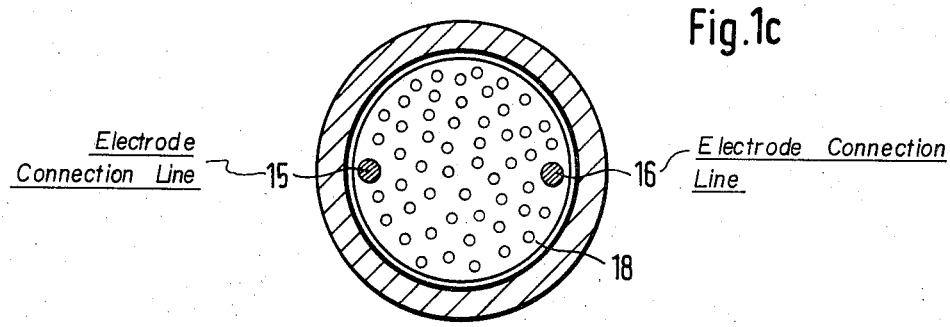
FIG. 1c is a sectional view of the ignition onset sensor head portion of FIG. 1a taken along line II—II in the direction of the arrows.

FIGS. 1b and 1c are sectional views of the ignition onset sensor head portion of FIG. 1a. The window 14 of the photoconductor 11 is visible through the opening of the frustoconical casing 10, as are the electrodes 12 and 13, facing one another in parallel disposition, and individual optical fibers, indicated by small circles 18, of the photoconductor 11. Zig-zag arrows represent the area in which the burn-off process is performed in order to free the head portion of the ignition onset sensor 24 from dirt particles.

In FIG. 1c, the individual fibers 18 of the photoconductor 11 are shown, as well as the connection lines 15 and 16 for the two electrodes 12 and 13.

If, instead of the burn-off process, glow heating is the selected means of removing dirt from the photoconductor window 14, then in place of the two electrodes 12 and 13 a glow filament is provided. This glow filament does cause a partial obscuring of the window 14 of the photoconductor 11. However, because with the ignition onset sensor of the invention, no measurement signal for the absolute light intensity is required, but only a measurement signal for the relative variation in light intensity, this partial obscuring is not a problem.

Figure 2:
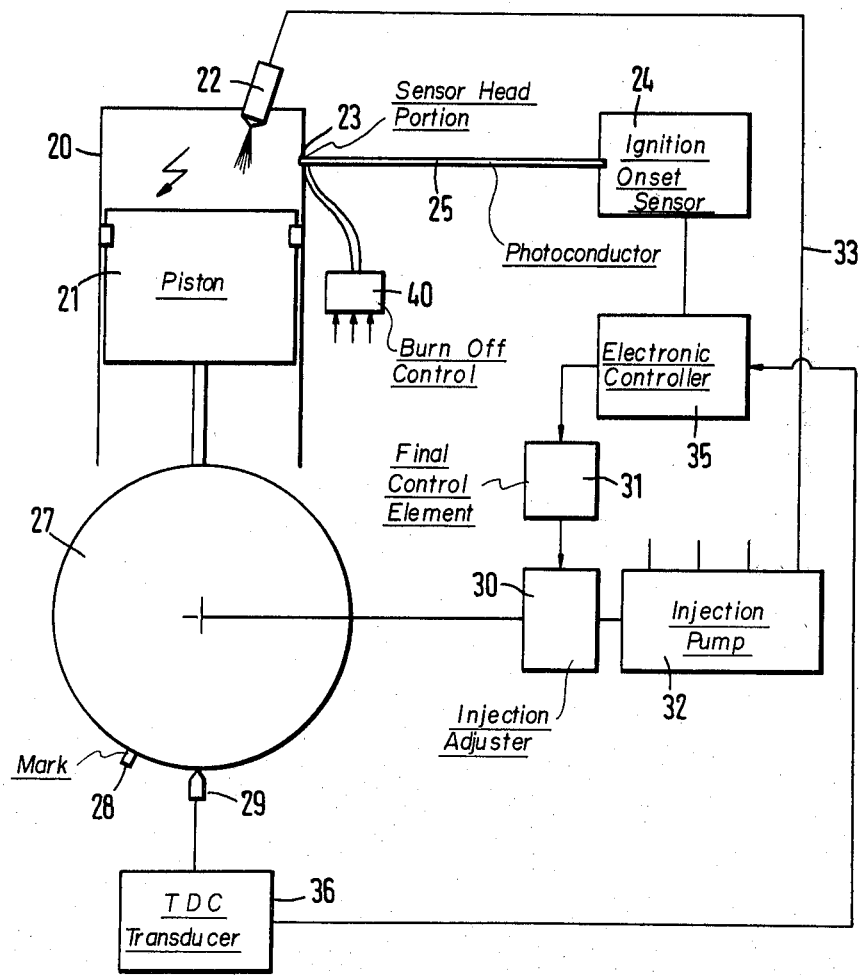
FIG. 2 is the schematic representation of an internal combustion engine with auto-ignition and having an ignition onset adjuster which is controlled in accordance with the output signal of the ignition onset sensor.

FIG. 2 shows in schematic form the injection system in an internal combustion engine with auto-ignition and having an injection onset adjustment apparatus which is similar or identical to the known injection onset apparatus described in the above-referenced U.S. Pat. No. 4,033,310, U.S. Pat. No. 4,019,478, U.S. Pat. No. 3,943,430, and U.S. Pat. No. 3,746,197. A piston 21 moves in the axial direction within an engine cylinder 20, shown schematically. Projecting into the combustion chamber is an injection nozzle 22 and the head portion 23 of an ignition onset sensor 24 for generating a signal indicating the onset of combustion within the combustion chamber of the cylinder 20, in response to a sudden increase in the intensity of the light which is received at the photoconductor end surface 14 and is transmitted through the photo-conductor 11 to a light-voltage converter 25 of the ignition onset sensor 24. It is not necessary that the ignition onset sensor 24 detect an absolute light intensity, but only that it generate the ignition onset signal in response to a relative increase in the received light intensity as a function of time, which occurs at the onset of ignition. For example, the ignition onset sensor 24 may include a signal differentiating circuit 41, connected in series with the light-voltage converter 25, as shown in FIG. 3, for differentiating the output signal of the light-voltage converter 25 corresponding to the absolute light intensity. Thus, the differentiating circuit 41 will generate a differentiated signal in response to variations in the absolute light intensity signal generated by the light-voltage converter 25, the differentiated signal being of one polarity when the absolute light intensity is increasing and being of an opposite polarity when the absolute light intensity is decreasing. The differentiated signal is supplied to a threshold voltage switching device 42, which generates the ignition onset signal in response to a differentiated signal of one polarity caused by an increase in the absolute light intensity signalling the onset of ignition, such as shown in FIGS. 8 and 9 of U.S. Pat. No. 4,130,097. In FIG. 2, a crankshaft disc 27 is shown in schematic form, with the top dead center position of the piston 21 being detectable by means of a sensor 29 from a marking 28 on the circumference of the disc 27. This disc 27 is also coupled with an injection adjuster 30 of the ignition onset adjustment apparatus, which has a final control element 31 for this injection adjustment and which acts upon an injection pump 32. Although it represents four fuel supply lines departing from the injection pump 32, only one fuel supply line 33, leading to the fuel injection nozzle 22, is indicated in FIG. 2. An electronic controller 35 of the ignition onset adjustment apparatus processes signals from the ignition onset sensor 24 and from a TDC transducer 36 with the TDC sensor 29. The injection adjuster 30, the final control element 31 and the controller 35 are all of known design and correspond to their counterparts 1, 2 and 5, respectively, in FIG. 1 of U.S. Pat. No. 4,265,200, above-cited, in which it will be seen that the controller 5 similarly receives an ignition onset signal 1st-SB for regulating the onset of fuel injection in a Diesel engine without, however, employing an opto-electric sensor 24 for internal combustion engines, as in the present invention.

Reference numeral 40 indicates an apparatus for controlling the burn-off of the photoconductor window 14 in the sensor of FIG. 1a. Such a device is known in the art and is described, for example, in U.S. Pat. No. 4,196,622. The input variables of this apparatus 40 are time signals, depending on the desired appearance of the burn-off signal, a signal pertaining to the operational status of the engine, or signals pertaining to its operational parameters. For example, the burn-off control apparatus 40 may be an apparatus for providing a high voltage between the electrodes 12 and 13 to cause an electric arc across the gap between the electrodes 12 and 13 for a predetermined time in accordance with an input signal. The burn-off control apparatus is connected to receive the ignition onset signal generated by the ignition onset sensor 24, which actuates the burn-off control apparatus 40 to provide the high voltage between the two electrodes 12 and 13 for a selected period of time immediately after the onset of ignition. This embodiment of the burn-off control apparatus 40 may be similar to known apparatus for controlling the ignition spark onset in a spark-ignited internal combustion engine in accordance with an input control signal, such as that described in U.S. Pat. No. 4,158,350, issued June 19, 1979, to Moller et al. It has proved advantageous to perform the burn-off at the end of each operational cycle, and this burn-off procedure is then suitably triggered by the shut-off signal of the engine driving switch. For example, the heating element for burning off the light receiving end of the photoconductor 11 may be embodied as a glow filament 50, and the burn-off control apparatus 40 may be embodied as a timing circuit 52, connected across the engine driving switch 54, as shown in FIG. 4. When the engine driving switch 54 is opened, the timing circuit 52 is actuated to energize the glow filament 50 for a predetermined period of time.

Controlling the burn-off procedure in accordance with time recommends itself in such cases as when the engine is in stationary operation or when arbitrary combustion chambers are being monitored, such as in oil burners.

In the arrangement of FIG. 2, the electronic controller 35, in accordance with a signal relating to the top dead center of the piston 21 and the onset of ignition of the fuel injected into the cylinder 20 by means of the nozzle 22, generates a corresponding trigger signal for the final control element 31 of the injection adjuster 30. This injection adjuster 30 is driven by the crankshaft of the engine and effects the controlling in accordance with time of the injection pump 32. Now, it is possible, with the aid of the regulation of the ignition onset, to fix precisely the optimal onset of supply by the injection pump 32 at a particular time, so as to be able finally to set the optimal instant of fuel injection.

Long-term stability of the regulation procedure is attained on the basis of performing the burn-off or glow heating procedure either periodically or in accordance with operational status.

In FIGS. 1 and 2, the ignition onset sensor includes a photoconductor 11. Depending on the type of embodiment, the light-voltage converter 25 within the ignition onset sensor 24 may also be attached directly at the window 14 of the structure of FIG. 1a. The selection of a particular form depends on the given geometrical relationships and the properties of the light-voltage converter, because, in particular, both high temperatures and high pressures arise on the side of the ignition onset sensor facing the combustion chamber.

The apparatus described above may also be used as an indicator of problems, such as the absence of ignition. This is true in the field of internal combustion engines of both the stationary and non-stationary types, as well as in other combustion processes, such as in oil firing.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An ignition onset sensor for indicating the onset of ignition in a combustion chamber of an internal combustion engine, in response to variations in the intensity of light transmitted from the combustion chamber, comprising:
   a casing having one end connected to the combustion chamber and which defines an opening to the combustion chamber for receiving light therefrom,
   an opto-electric converter means having a receiver end surface facing the combustion chamber to receive light therefrom through said opening for generating an ignition onset signal,
   cleaning means for cleaning the receiver end surface, including
      electric heating means disposed within the casing adjacent the receiver end surface, for burning away dirt accumulating on the receiver end surface, and
      heat actuating means for actuating the electric heater means.

2. An ignition onset sensor, as described in claim 1, wherein the heater means comprises two spaced-apart electrodes and the heater actuating means include means for producing an electric arc between the two electrodes to burn off the accumulated dirt from the receiver end surface.

3. An ignition onset sensor, as described in claim 1, wherein the heater means comprises at least one glow filament which is disposed between the receiver end surface and said opening.

4. An ignition onset sensor, as described in claim 1, wherein:
   the internal combustion engine includes an engine driving switch which includes means for producing a shut-off signal at the end of each operating period of the engine; and
   the heater actuating means is triggered by the shut-off signal to actuate the heating means for a selected period of time.

5. An ignition onset sensor, as described in claim 1, wherein the heater actuating means actuates the heating means for a selected period of time immediately after the onset of ignition.

6. An ignition onset sensor, as described in claim 1, wherein the opto-electric converter means includes:
   a light-voltage converter means for converting light transmitted to the light-converter means into a voltage signal; and
   photoconductor means, which includes the receiver end surface and which extends between the receiver end surface and the light-voltage converter means, for transmitting light received by the receiver end surface from the combustion chamber to the light-voltage converter means.

7. An ignition onset sensor, as described in claim 1, wherein the opto-electric converter means generates the ignition onset signal in response to a relative increase in the intensity of light transmitted from the combustion chamber to the receiver end surface as a function of time.

8. An ignition onset sensor for indicating the onset of ignition in a combustion chamber of an internal combustion engine in response to variations in the intensity of light transmitted from the combustion chamber, comprising:
   means defining an opening to the combustion chamber for receiving light therefrom,
   an opto-electric converter means having a receiving surface disposed in said opening for generating an ignition onset signal,
   sensing means for generating at least one engine operating parameter signal, including an engine speed signal, and
   ignition onset regulating means for regulating the onset of ignition within the engine combustion chamber in accordance with the ignition onset signal and the at least one engine operating parameter signal.

* * * * *